US006021423A

United States Patent [19]

Nag et al.

[11] Patent Number: 6,021,423

[45] Date of Patent: Feb. 1, 2000

[54] METHOD FOR PARALLEL-EFFICIENT CONFIGURING AN FPGA FOR LARGE FFTS AND OTHER VECTOR ROTATION COMPUTATIONS

[75] Inventors: Sudip K. Nag, San Jose; Hare K. Verma, Campbell, both of Calif.

[73] Assignee: Xilinx, Inc., San Jose, Calif.

[21] Appl. No.: 08/937,977

[22] Filed: Sep. 26, 1997

[51] Int. Cl.[7] .............................. G06F 15/00; G06F 7/52

[52] U.S. Cl. .......................................... 708/622; 708/403

[58] Field of Search ......................... 364/726.01, 726.02, 364/726.03, 726.06, 726.07, 754.01, 754.02, 754.03; 708/403, 404, 405, 408, 409, 620, 607, 622

[56] References Cited

U.S. PATENT DOCUMENTS

| | | | |
|---|---|---|---|
| 3,777,130 | 12/1973 | Croisier et al. | 235/152 |
| 4,680,727 | 7/1987 | White | 364/754 |
| 4,970,674 | 11/1990 | White | 364/726 |
| 5,033,019 | 7/1991 | White | 364/726 |
| 5,339,265 | 8/1994 | Liu et al. | 364/725 |
| 5,371,753 | 12/1994 | Adsett | 372/36 |

OTHER PUBLICATIONS

Cooley, James W. and Tukey, John W., Apr. 1965, "An Algorithm for the Machine Calculation of Complex Fourier Series," Math of Comput., vol. 19, pp. 297–301.

New, Bernie, Aug. 17, 1995, "A Distributed Arithmetic Approach to Designing Scalable DSP Chips," EDN, pp. 107–114.

White, Stanley A., Jul. 1989, "Applications of Distributed Arithmetic to Digital Signal Processing: A Tutorial Review," IEEE ASSP Magazine, pp. 4–19.

*Primary Examiner*—Chuong Dinh Ngo

*Attorney, Agent, or Firm*—Adam H. Tachner; Jeanette S. Harms

[57] ABSTRACT

A method using replication of distributed arithmetic logic circuits and recursive interpolation of reduced angular increments of sine and cosine sum constants in logic look-up tables permits the computation of vector rotation and large FFTs in an efficient-parallel fashion within a unitary field programmable gate array chip, without off-chip memory for storing constants.

3 Claims, 7 Drawing Sheets

PSR = Parallel to Serial Register
SPR = Serial to Parallel Register
• = Adder/Subtractor

METHOD FOR PARALLEL-EFFICIENT CONFIGURING AN FPGA FOR LARGE FFTS AND OTHER VECTOR ROTATION COMPUTATIONS

CROSS-REFERENCE TO RELATED APPLICATIONS

This is a related application to U.S. patent application Ser. No. 08/815,019, entitled "A METHOD FOR CONFIGURING AN FPGA FOR LARGE FFTS AND OTHER VECTOR ROTATION COMPUTATIONS", which is incorporated herein by reference.

FIELD OF THE INVENTION

The present invention relates generally to the field of digital signal processing (DSP)in field programmable gate arrays (FPGAs) and more specifically to a method of carrying out complex vector rotation computations, such as large fast Fourier transforms (FFTs), in a single FPGA using a highly parallel data flow format.

BACKGROUND OF THE INVENTION

The use of FPGAs for carrying out high speed arithmetic computations has gained recognition in recent years. FPGA architectures including logic blocks having multiple look-up-table function generators, such as the XC4000™ family of devices from XILINX, Inc., the assignee of the present invention, are particularly suited for such computations. However, many of the important DSP algorithms are multiply-intensive, and even FPGAs having the largest number of logic blocks normally can't embed the multiplier circuits and the attendant control and support circuits in a single chip. It becomes incumbent on the designer to choose efficient DSP algorithms and to realize them with efficient circuit designs. The fast Fourier transform (FFT) is an outstanding example of an efficient DSP algorithm and distributed arithmetic is a well established design approach that replaces gate-consuming array multipliers with efficient shift and add equivalent circuits that offer comparable performance.

The discrete Fourier transform (DFT) of a sampled time series is closely related to the Fourier transform of the continuous waveform from which the time samples were taken. The DFT is thus particularly useful for digital power spectrum analysis and filtering. The FFT is a highly efficient procedure for computing the DFT of a time series and was reported by Cooley and Tukey in 1965 ("AN ALGORITHM FOR THE MACHINE CALCULATION OF COMPLEX FOURIER SERIES" by J. W. Cooley and J. W. Tukey, Math of Comput., Vol. 19, pp. 297–301, April 1965).

The FFT takes advantage of the fact that the calculation of the coefficients of the DFT can be carried out interactively, which results in a considerable savings of computation time. If the time series contains $N=2^n$ samples, then for the N Fourier coefficients the FFT entails $2nN=2N\log_2 N$ multiply operations (assuming a radix 2 butterfly). In contrast, the DFT algorithm requires $N^2$ multiply operations. The FFT advantage grows as N increases. Thus, an 8 point DFT and FFT require 64 and 48 multiply operations, respectively, while an 8192 point DFT and FFT require $67.1\times10^6$ and 212,384 multiply operations, respectively.

Distributed Arithmetic (DA) was developed as an efficient computation scheme for digital signal processing (DSP). A United States patent describing this scheme is U.S. Pat. No. 3,777,130 issued Dec. 3, 1974 entitled "DIGITAL FILTER FOR PCM ENCODED SIGNALS" by Croisier, D. J. Esteban, M. E. Levilion and V. Rizo. A comprehensive survey of DA applications in signal processing was made by White in "APPLICATIONS OF DISTRIBUTED ARITHMETIC TO DIGITAL SIGNAL PROCESSING: A TUTORIAL REVIEW", S. A. White, IEEE ASSP Magazine, July 1989.

The DA computation algorithm is now being effectively applied to embed DSP functions in FPGAs, particularly those with coarse-grained look-up table architectures. DA enables the replacement of the array multiplier, central to many DSP applications, with a gate-efficient serial/parallel multiplier with little or no reduction in speed. However, available FFT implementations have been limited in size due to space constraints.

DA makes extensive use of look-up tables (LUT's), thereby exploiting the LUT-based architecture of the Xilinx and other similarly structured FPGAs. The LUT used in a DA circuit will hereafter be called a DALUT. One can use a minimum set of DALUTs and adders in a sequential implementation to minimize cost. However, speed/cost tradeoffs can be made. Specifically, for higher speed, more DALUTs and adders may be employed. With enough DALUTs and adders, the range of tradeoffs extends to full parallel operation with all input bits applied simultaneously to the DALUTs and an output response generated at each system clock.

DA differs from conventional arithmetic only in order in which it performs operations. The transition from conventional to distributed arithmetic is illustrated in FIGS. 1, 2 and 3. In FIG. 1 which illustrates conventional arithmetic, the sum of products equation, $S=A\cdot K+B\cdot L+C\cdot M+D\cdot N$, is implemented with 4 serial/parallel multipliers operating concurrently to generate partial products. The full products are then summed in an adder tree to produce the final result, S. The functional blocks of the serial/parallel multiplier shown in the box of FIG. 1 include an array of 2-input AND gates with the A input derived from a parallel to serial shift register and the K input applied bit-parallel to all AND gates. A P bit parallel adder accepts the AND gate outputs addend inputs and passes the sum to an accumulator register. A divide by 2 block feeds back the register output to the augend inputs of the adder. In each clock cycle one bit of the serially organized data (Ai, Bi, Ci, Di) is ANDed with parallel operands (K, L, M, N) and four partial products are generated. Starting with the least significant serial bits, the partial products are stored in the four accumulator registers. On the next clock cycle, the next least significant bits again form partial products which are then added to the scaled by ½ previous partial product. The process repeats on successive clock cycles until the most significant bits have been shifted. When all the partial products, appropriately scaled, have been accumulated, they are fed to the adder array to produce the final output, S. Distributed arithmetic adds the partial products before, rather than after, scaling and accumulating them.

FIG. 2 shows the first embodiment of the distributed arithmetic technique. The number of shift and add circuits is reduced to one and is placed at the output of the array of simple adders, the number of simple adders remains the same. The two-input AND gates now precede the adders.

In a very important class of DSP applications known as linear, time-invariant systems, the coefficients (K, L, M and N in our example) are constants. Consequently, the data presented to the shift-and-add circuit (namely, the output of the AND gates and the three simple adders) depend only on the four shift register output bits. Replacing the AND gates and simple adders with a 16 word look-up table (DALUT) provides the final form (FIG. 3) of the distributed arithmetic implementation of the sum of products equation.

The DALUT contains the pre-computed values of all possible sums of coefficients weighted by the binary variables of the serial data (A, B, C and D) which previously constituted the second input to the AND gates. Now, with the four serial data sources serving as address lines to the DALUT, the DALUT contents may be tabulated as follows:

| A | B | C | D | Address | Content |
|---|---|---|---|---|---|
| 0 | 0 | 0 | 0 | 0 | 0 |
| 0 | 0 | 0 | 1 | 1 | N |
| 0 | 0 | 1 | 0 | 2 | M |
| 0 | 0 | 1 | 1 | 3 | M + N |
| 0 | 1 | 0 | 0 | 4 | L |
| 0 | 1 | 0 | 1 | 5 | L + N |
| 0 | 1 | 1 | 0 | 6 | L + M |
| 0 | 1 | 1 | 1 | 7 | L + M + N |
| 1 | 0 | 0 | 0 | 8 | K |
| 1 | 0 | 0 | 1 | 9 | K + N |
| 1 | 0 | 1 | 0 | 10 | K + M |
| 1 | 0 | 1 | 1 | 11 | K + M + N |
| 1 | 1 | 0 | 0 | 12 | K + L |
| 1 | 1 | 0 | 1 | 13 | K + L + N |
| 1 | 1 | 1 | 0 | 14 | K + L + M |
| 1 | 1 | 1 | 1 | 15 | K + L + M + N |

In general, the length (number of words) in the DALUT is $2^a$ where "a" is the number of address lines. The width, or number of bits per word cannot be precisely defined; it has an upper limit of b+log2a due to computation word growth where the coefficients are summed, as the content of the DALUT indicates (wherein b is the number of coefficient bits). The width of the table defines the coefficient accuracy and may not match the number of signal bits (e.g., the bits of A, B, C, and D) which define the dynamic range or linearity of the computation process.

Large FFTs in a Single FPGA

Now that the array multiplier has been replaced by a gate-efficient distributed circuit, there remains a second obstacle to overcome before a large size FFT can be practically embedded in a single FPGA, namely, the large memory required for the sine/cosine basis functions. This problem was addressed, in part, in related U.S. patent application Ser. No. 08/815,019, entitled "A METHOD FOR CONFIGURING AN FPGA FOR LARGE FFTS AND OTHER VECTOR ROTATION COMPUTATIONS", incorporated herein, which introduced the radix-2 butterfly core for implementation of an FFT in an FPGA environment. The radix-2 butterfly core comprises a gate array implementation of the complex multiplication $(x+jy)e-j\theta$ where x and y are rectangular coordinates of a complex vector and $\theta$ is an angle of rotation. Complex multiply computations are iterative and are performed in pipelined DA stages that are nearly identical save for their look-up tables which reflect the angle segments.

Referring to FIG. 4, we see a simplified version of the radix-2-based FFT implementation. It should be noted, however, that for large transforms, higher order radices (e.g. 4 or 8) may offer greater efficiency—these, too, are amenable to DA implementation. The circuit has two inputs $X_m$ and $X_n$, and two outputs $A_m$ and $A_n$. Their relationship can be summarized as: $A_m=X_m+X_n=X_{Rm}+X_{Rn}+j\ (X_{Im}+X_{In})$; and $A_n=[X_m-X_n]\times W^k$, where $W^k=e^{-j\theta}k=\cos\theta_k-\sin\theta_k$ and $\theta_k=(2\Pi k)/N$. $A_n$ can be simplified as $A_n=(X_{Rm}-X_{Rn})\cos\theta_k+(X_{Im}-X_{In})\sin\theta_k+j[(X_{Rm}-X_{Rn})(-\sin\theta_k)+(X_{Im}-X_{In})\cos\theta_k]$.

Implementation of the above equations in an FPGA is therefore accomplished using a DALUT which contains the pre-computed sums of partial products for combinations of the input variables $(X_m-X_n)$, and for all N/2 values of $\theta_k$. The DALUT is addressed by the two input variables $(X_{Rm}-X_{Rn})$ and $(X_{Im}-X_{In})$ and the k bits defining $\theta_k$.

While the radix-2 implementation disclosed in the parent case provides a number of significant advantages over the prior art, there remains a need to increase the speed of such circuits without increasing the size of FPGA-implemented DSP circuit designs beyond the capacity of available devices.

SUMMARY OF THE INVENTION

To address the shortcomings of the available art, a high-speed, parallel implementation of the radix-2 butterfly core is provided which capitalizes on the limited number of values for $f(\theta_k)$ (e.g., the four values of $X_m$ and $X_n$ {00}, {01}, {10}, and {11}). By restructuring the DALUTs to generate the limited number of values for a particular $\theta_k$, the parallel implementation easily selects the proper value for $X_m$ and $X_n$, resulting in a significant increase in speed of execution (e.g., 16-times faster for a 16-bit wide implementation) without significantly increasing the amount of space required for the implementation.

BRIEF DESCRIPTION OF THE DRAWINGS

The aforementioned objects and advantages of the present invention as well as additional objects and advantages thereof will be more fully understood hereinafter as a result of the detailed description of a preferred embodiment when taken in conjunction with the following drawings in which.

DETAILED DESCRIPTION OF A PREFERRED EMBODIMENT

Figure 1:
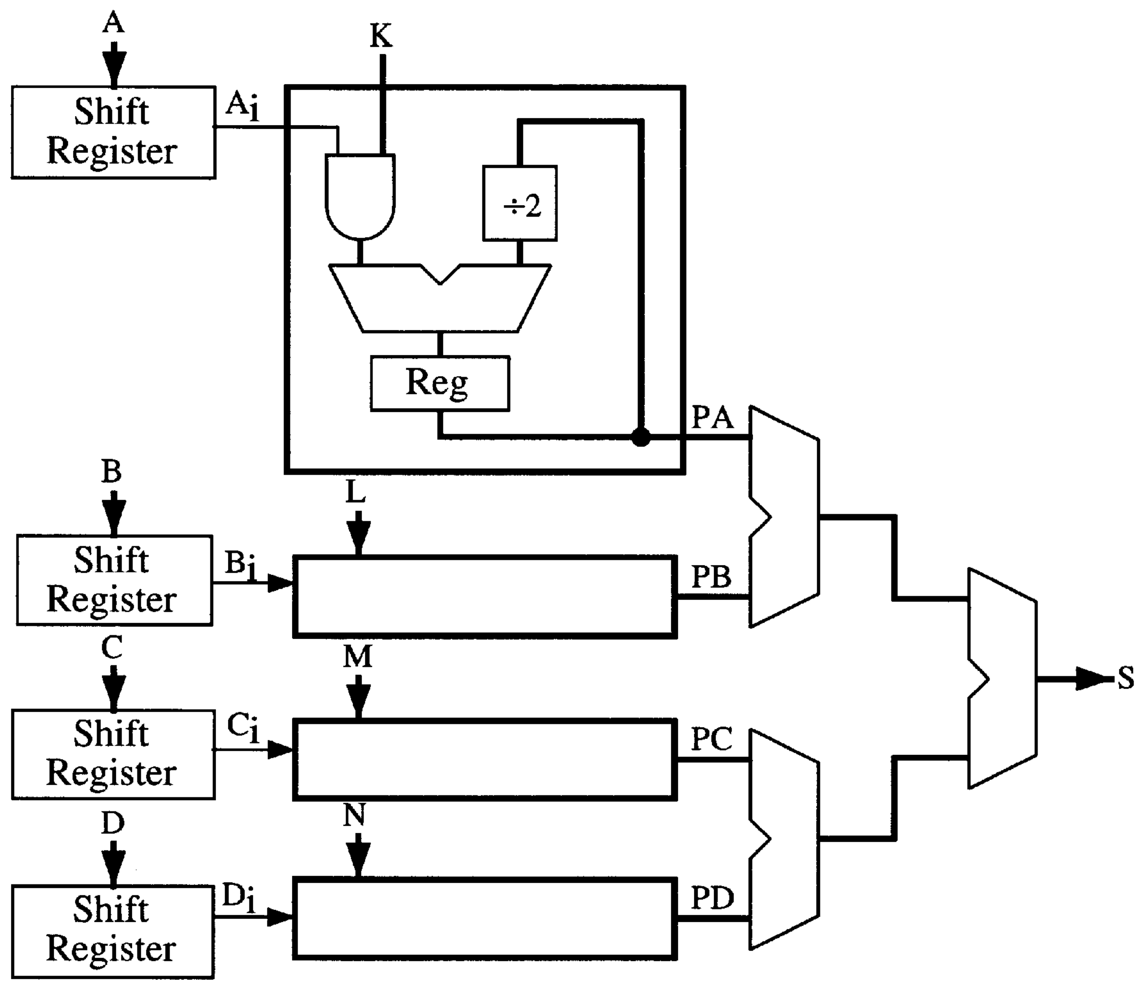
FIG. 1 is a block diagram of a conventional four-product multiply and accumulate circuit.
Figure 2:
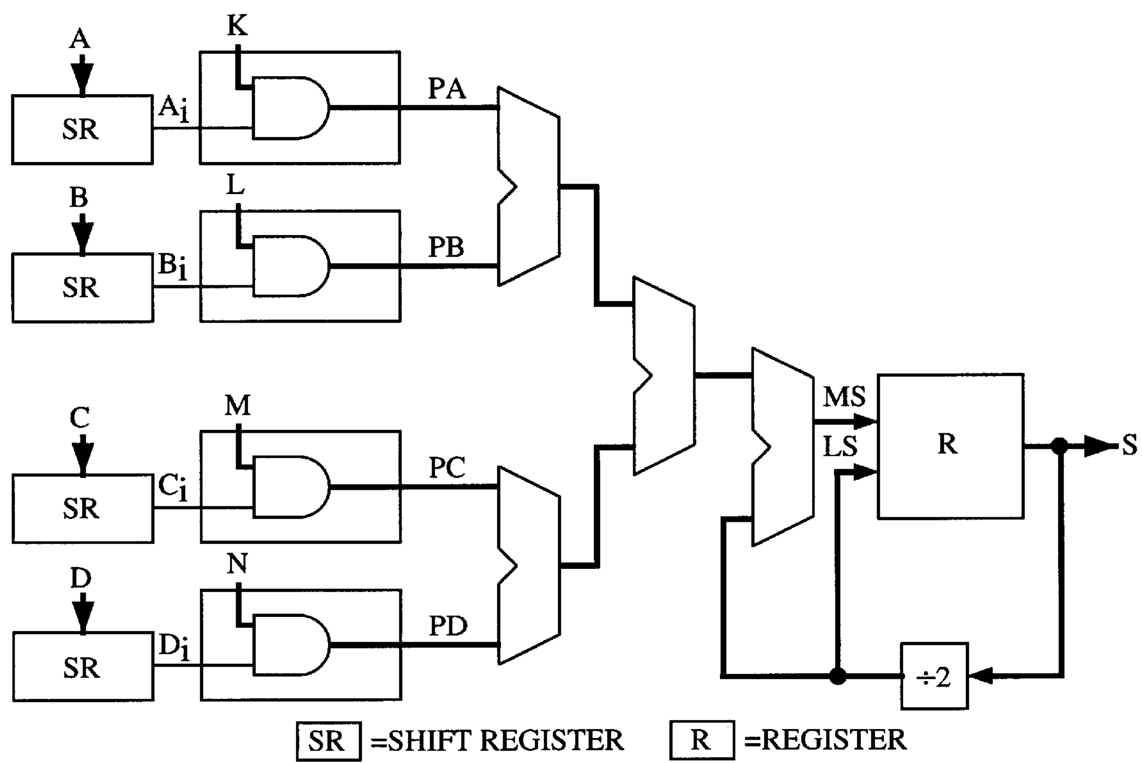
FIG. 2 is a block diagram of the multiply and accumulate circuit of FIG. 1, but reorganized to reduce the number of shift and add operations.
Figure 3:
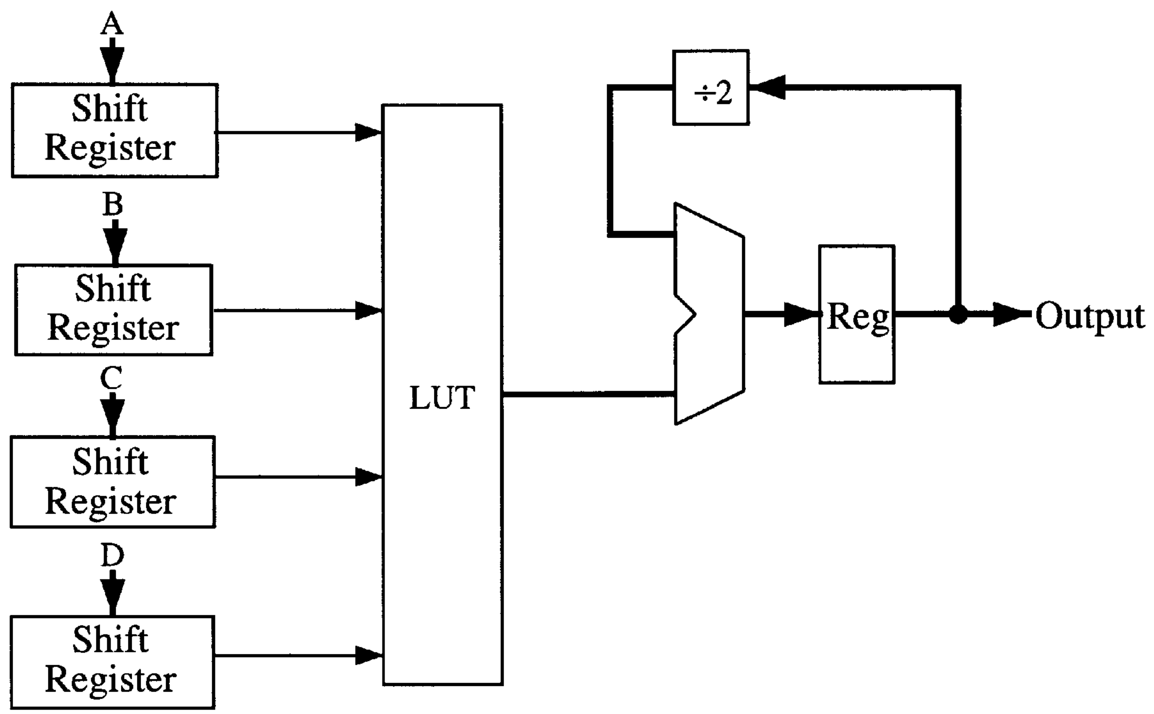
FIG. 3 is a block diagram of a multiply and accumulate circuit in which a look-up-table replaces AND gates and adders of the circuit of FIG. 2.
Figure 4:
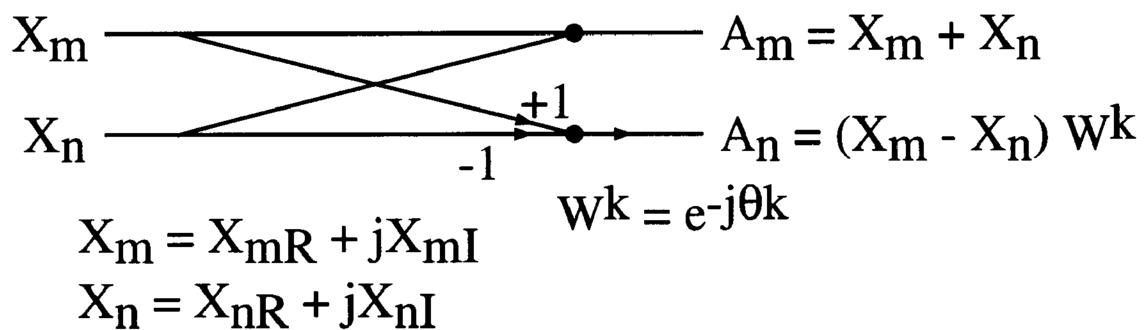
FIG. 4 is an FFT radix-2 butterfly diagram or computation flow diagram referred to as a butterfly computation because of the shape of the diagram.

The sum-of-products (or vector dot product) equation wherein each term has a constant (e.g. coefficient) and variable (data) factor, defines the response of linear, time-invariant networks. Notable examples are the discrete Fourier transform (DFT) and its efficient offspring—the fast Fourier transform (FFT). Distributed arithmetic is a scheme for computing this sum-of-products without resorting to a full array multiplier. The multiplier is replaced by shift and add operations—a computation that is serial by multiplier bit (data) and parallel by multiplicand word (the constant factors). This technique is, of course, reminiscent of the software multiply technique of early computers. All of the serially multiplied product terms are computed concurrently; i.e., the partial product is the sum of the partial products of all the terms. The arithmetic sum of all partial products, namely, the sum of all the constant factors logically ANDed with their respective multiplier bits (1's and 0's) for all possible combination of the multiplier bits, is stored in a DALUT. To avoid the need for massive DALUTs for larger point FFTs (e.g., N=8192), a single DALUT serves all multiplier bits since $\theta_k$ is decomposed into a sum of increasingly finer angle increments such that replicated DA stages with DALUTs 32 words or less can perform the complex multiplication to produce the required output.

Starting with the least significant data bits the DALUT is addressed and its contents stored in an accumulator register. The next significant bits address the same DALUT and its new contents are now added to one-half the previously stored value. The process repeats until the sign bits address the DALUT; its contents are subtracted from the stored sum yielding the response of the network. Thus, DA offers the gate efficiency of a serial implementation with performance approaching that of an array multiplier accumulator chip.

The dot product structure amenable to DA solution can be discerned from the equations listed below. The X's are the input variables and the $\sin\theta_k$, $\cos\theta_k$ represent the constant factors. If $X_R=(X_{Rm}-X_{Rn})$ and $X_L=(X_{Lm}-X_{Ln})$ and both serve as address inputs to the DALUT, then the DALUT for the real component contains all possible combinations of $X_{Rb}\,\mathrm{COS}\theta_k+X_{Lb}\,\mathrm{SIN}\theta_k$ while the DALUT for the imaginary component contains all possible combinations of $X_{Rb}(-\mathrm{SIN}\theta_k)+X_{Lb}\,\mathrm{COS}\theta_k$. Here the $X_b$s denote the multiplier bit values. Thus, for each value of k there are 4 words stored in each DALUT. Consequently, a 32 word configurable logic block (CLB) can provide the partial product contents for 8 values of $\theta$ (i.e., k=0, 1 . . . , 7) providing a 16 point FFT. A schematic diagram of the DA functional blocks for this 16 point FFT butterfly computer is provided in FIG. 5. The functional blocks consisting of serial adders and subtractors, parallel adders, shift registers, parallel-to-serial-registers, and truth tables (DALUTs) can all be readily configured in Xilinx CLBs.

Figure 5:
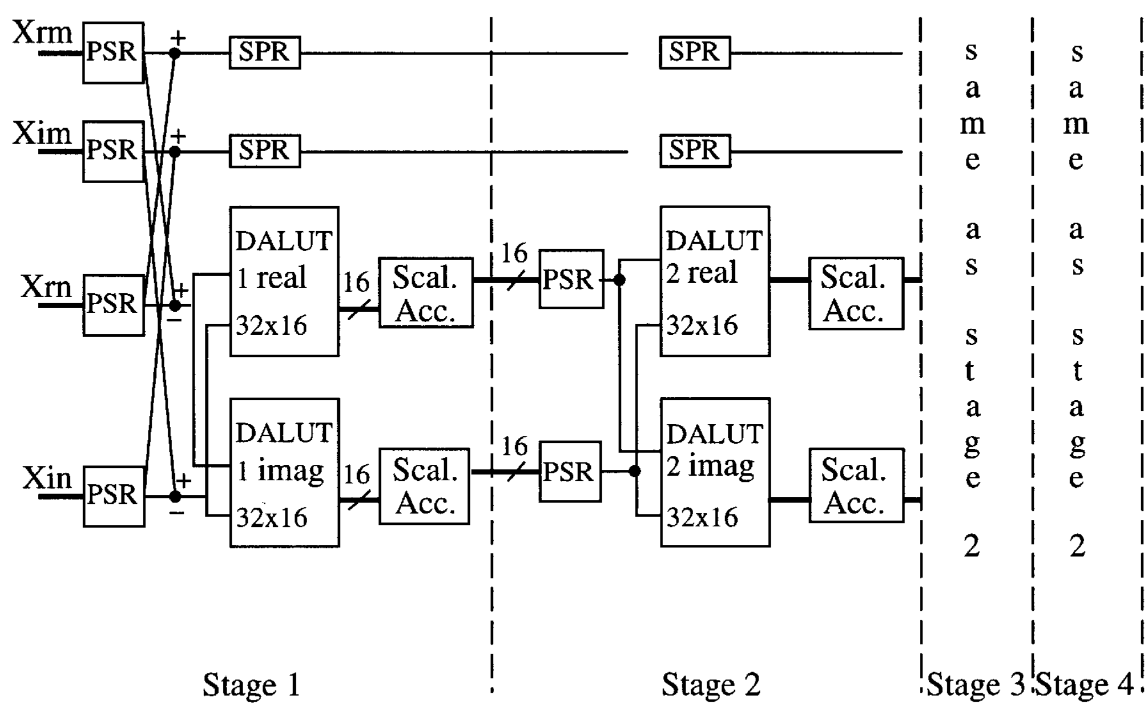
FIG. 5 is a schematic representation of a serial, radix-2 based FFT implementation, first disclosed in related U.S. patent application Ser. No. 08/815,019.
Figure 6:
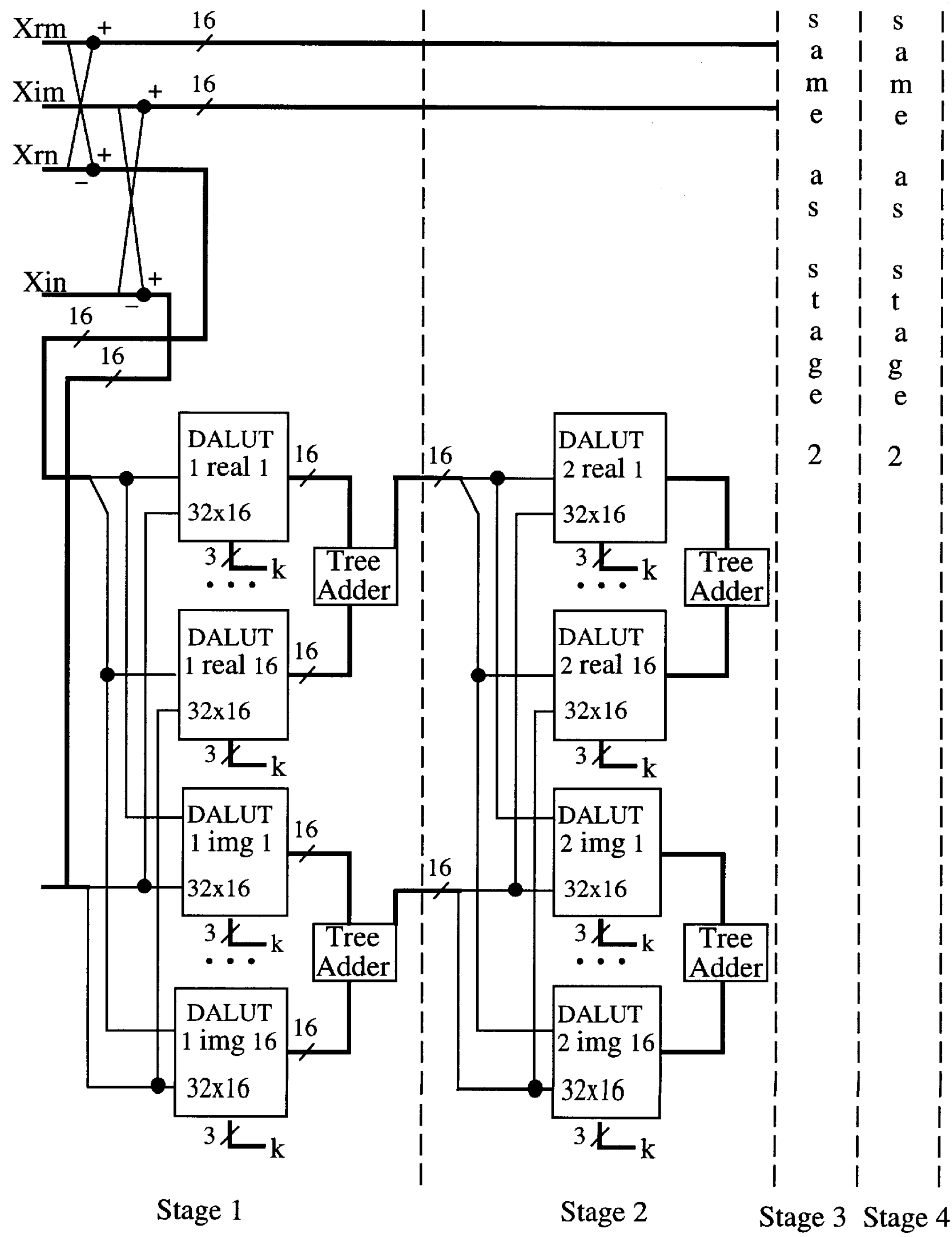
FIG. 6 is a schematic representation of a parallel implementation of the circuit of FIG. 5.

A parallel implementation of the circuit of FIG. 5 is provided in FIG. 6. The bus-width for $X_m$ and $X_n$ is b-bits and the sin/cos accuracy is c-bits. By extending the implementation to accommodate parallel data flow we will induce b-times data flow acceleration and will require (b−1)/a additional DALUTs, where a is the number of stages in the circuit (e.g., log(N/2)/3 when using (32×c) size DALUTS).

Figure 7:
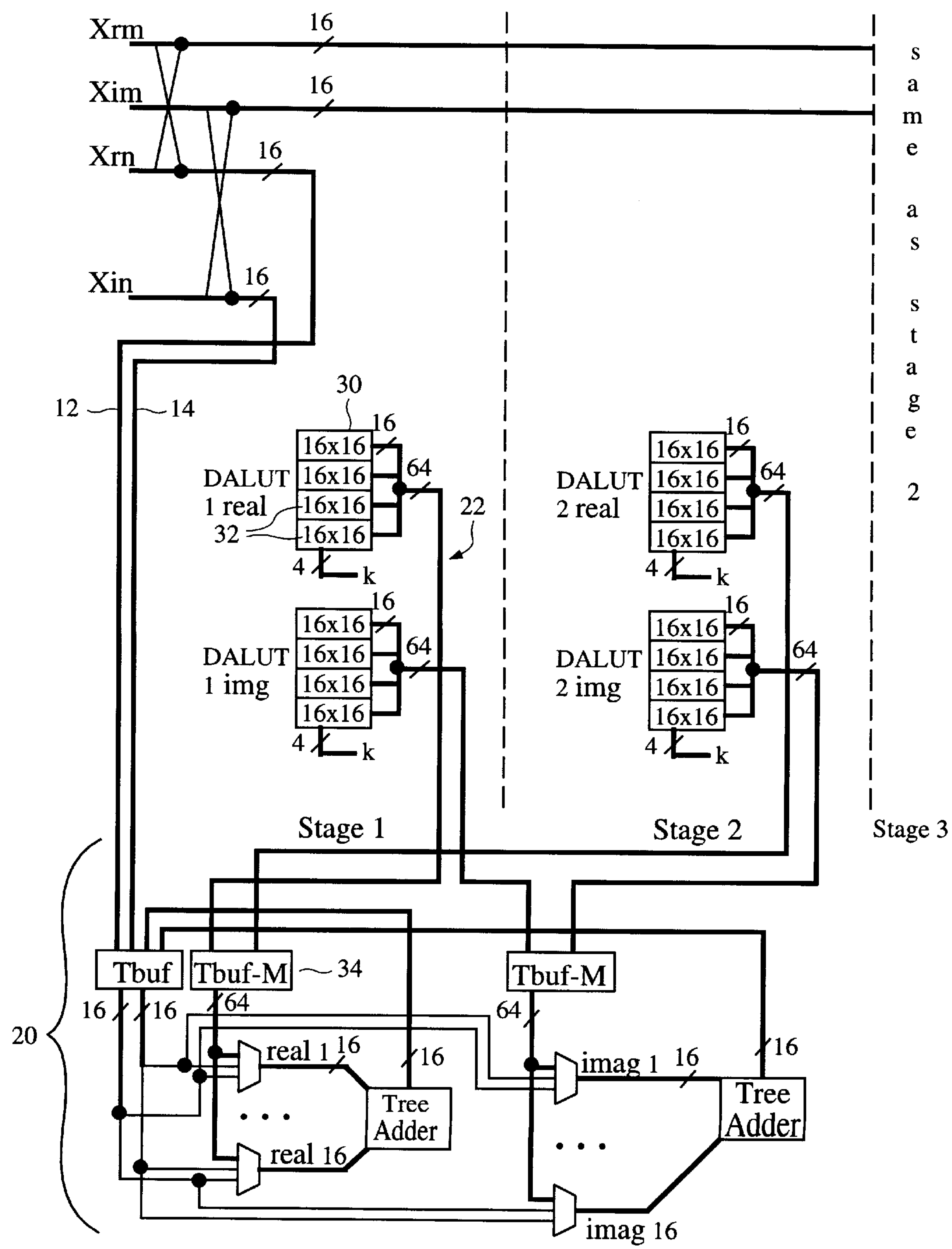
FIG. 7 is a schematic representation of an improved circuit having parallel data flow in a radix-2 based FFT implementation.

The same data flow acceleration is achieved within a smaller area by utilizing the preferred parallel implementation illustrated in FIG. 7. Since there are only four potential values for the two-bit signal $\{X_m, X_n\}$, the number of DALUTs needed to implement the circuit can be reduced considerably, thereby reducing the necessary implementation space. Instead of the 16 DALUTS required for each of the real and imaginary domains in the circuit of FIG. 6, the preferred embodiment utilizes a single DALUT 30 having four 16×16 segments. The 64-bit signal from DALUT 30 is forwarded across line 22 to control logic 20 where it is multiplexed to select a 16-bit input signal from one of four DALUT segments 32 according to the values of $X_m$ and $X_n$ received across lines 12 and 14. The DALUTs of Stage 2 and Stage 3 are similarly tied to control logic 20, sharing access via wide-input multiplexers (TBUFs) 34.

By using the approach illustrated in FIG. 7, the number of DALUTs required is considerably reduced. Moreover, the number of stages required for a complete FFT implementation is diminished to log(N/2)/4. We will illustrate the efficiency of the present invention by comparing the total area required for the serial implementation of FIG. 5, parallel implementation of FIG. 6, and preferred implementation of FIG. 7. We will assume an N-point FFT where the data is b bits-wide, the sine-cos value is c bits-wide, and the DALUT addressing is done with $k=\log_2(N/2)$ bits.

For the serial implementation of FIG. 5, we will assume the DALUTs will be size 32×c, implemented in c CLBs. Thus, the total number of DALUTS is a=k/3 (for each of the real and imaginary parts) and the total number of CLBs required is 2ac or 2ck/3. Two scaling accumulators (c-bit wide) will consume c CLBs. Four 2-input adders (with carry storage) at the input stage require four CLBs, and four b-bit wide PSRs will require 2b CLBs. Thus, the total number of CLBs required is 2ck/3+c+4+2b. Operating speed is assume to be S.

For the parallel implementation of FIG. 6, we require b-times the number of DALUTs in serial mode, or 2acb=2bck/3, thereby providing bS speed. Two adder-trees add the b parallel outputs, two at a time, requiring (b−1)c CLBs. Four b-input adders at the input stage add 2b CLBs, leaving a total of 2bck/3+(b−1)c+2b CLBs.

Finally, for the preferred efficient-parallel implementation illustrated in FIG. 7, each DALUT is formed as a 4×16×c array addressed by four of the k bits and requires 2c CLBs to implement. The total number of DALUTs required for each of the real and imaginary parts is aa=k/4, leaving the total number of CLBs required for DALUTs at (2*[2c*aa])=ck. Two TBUF multipliers require k/4 CLBs, while b output multiplexers require bc CLBs. Two adder-trees require (b−1)c CLBs and four b-input adders require 2b CLBs. The total number of CLBs is thereby reduced to ck+k/b+bc+(b−1)c+2b, while still providing bS speed performance, as with the circuit of FIG. 6.

For the example illustrated in FIGS. 5–7 (N=8192, k=12, b=16, and c=16) the serial mode will require 180 CLBs but provide only S speed. While the implementation of FIG. 6 provides 16S speed, 2,320 CLBs are required, making the circuit too large for implementation in an available programmable device. And finally, the preferred parallel implementation provides 16S speed with only 723 CLBs, a 70% size reduction easily implemented in, for example, an available Xilinx FPGA product. The percentage reduction in size will increase with larger-point FFTs or wider bus-widths.

It will be understood that the disclosed embodiments are of an exemplary nature and that the inventive method is conducive to even larger and more complex computations not explicitly disclosed herein. Accordingly, the present invention is to be limited only by the appended claims and their equivalents.

We claim:

1. A method for configuring a field programmable gate array (FPGA) for carrying out a complex multiplication of the type $(X_M-X_N)e^{(-j\Theta(k))}$ where $X_M$ and $X_N$ are complex input variables having real and imaginary parts, where $X_{RM}$ represents the real part and $X_{IM}$ represents the imaginary part of $X_M$ and where $X_{RN}$ represents the real part and $X_{IN}$ represents the imaginary part of $X_N$, and $\Theta(k)=2\pi k/N$ where N is a predetermined integer, the FPGA having an array of distributed arithmetic look-up-tables having sums of sin $\Theta$ and cos $\Theta$ factors stored therein and addressed by bits of $\Theta(k)$, an array of multiplexers controlled by bits of $(X_M-X_N)$ and registers to differentiate between different pipelined stages, the method comprising the following steps:

a) dividing said FPGA into a plurality of pipelined stages with each stage having at least two sets of four distributed arithmetic look-up-tables, a first set for a real component and a second set for an imaginary component, and as many multiplexers as the number of bits in either of $(X_{RM}-X_{RN})$ and $(X_{IM}-X_{IN})$;

b) each pipelined stage computing the partial value of the product $(X_M-X_N)e^{(-j\Theta(k))}$, the partial product being computed using four bits of k corresponding to a partial angle rotation of $(X_M-X_N)$, the number of pipelined stages being equal to the rounded up value of the real number obtained by dividing the number of bits in k by four;

c) addressing the four look-up-tables of each pipelined stage with four bits of k corresponding to a partial angle rotation of $(X_M-X_N)$ and outputting the partial products for the four possible values 00, 01, 10 and 11 of a bit of $(X_{RM}-X_{RN})$ and a bit of $(X_{IM}-X_{IN})$;

d) each said pipelined stage having as many multiplexers as the number of bits in either of $(X_{RM}-X_{RN})$ and $(X_{IM}-X_{IN})$, the input to each multiplexer being the four outputs of the look-up-tables, among which one is selected in a manner based upon a bit from $(X_{RM}-X_{RN})$ and $(X_{IM}-X_{IN})$;

e) adding the outputs of the multiplexers;

f) applying the output signal generated by the adding step to a next pipelined stage as the input thereto and ultimately to a final pipelined stage as the computational output thereof.

2. A method of computing a rotation of a vector X, where X is a complex number $X_R+jX_I$, through a selected angle $\Theta$, a resultant rotated vector being represented by $Xe^{(j\Theta)}$, using a digital device having distributed arithmetic look-up table memory, multiplexers, and adders, the method comprising the steps of:

a) determining the number of stages of vector rotation compatible with the capacity of said memory;

b) dividing said vector rotation into a plurality of successively smaller angle rotation increments toward said selected angle $\Theta$, said number of increments being equal to the number of said stages, the look-up table memory distributed in each such stage having stored sums of trigonometric constant factors based upon said smaller angle rotation increments;

c) carrying out computations in each said stage using corresponding look-up table memory-stored sums of trigonometric constant factors multiplied with two bits of $X_R$ and $X_I$, said factors being selected for the corresponding increments of angle of rotation for the respective stage; and d) adding the outputs of said multiplexers in each said stage and transferring the computational output of each such stage to the next successive stage as the input thereto and ultimately for the final stage as the computational output of said digital device, the added outputs of said multiplexers in each stage providing a bit parallel input address to the look-up table memory in the next successive stage.

3. A method for providing a speed-efficient and gate-efficient implementation of the complex vector rotation defined by the term $(X+jy)e^{(j\Theta)}$ using a field programmable gate array; the method comprising the following steps:

a) expressing the vector rotation in a sum of products form $(X+jy)e^{(j\Theta)}=X\cdot\cos\Theta-Y\cdot\sin\Theta+j(Y\cdot\cos\Theta+X\cdot\sin\Theta)$;

b) storing in distributed arithmetic look-up tables factors based upon said sum of products form for selected values of $\Theta$ and for selected values of X and Y;

c) employing successive angle rotation increments by partitioning angle ranges into successively smaller sets of increments of angle $\Theta$ to reduce the look-up table memory required in step b);

d) using multiplexers, logic gates and tri-stated buffers with said field programmable gate array to multiplex the outputs of said look-up-tables;

e) using fast carry logic with said field programmable gate array to add the outputs of said multiplexers;

f) providing the added multiplexer outputs in bit parallel form to said look-up tables having said successively smaller angle rotation increments.

* * * * *